United States Patent [19]

Moczygemba et al.

[11] 4,223,116

[45] Sep. 16, 1980

[54] CONJUGATED DIENE POLYMERIZATION PROCESS AND CATALYST

[75] Inventors: George A. Moczygemba; Henry L. Hsieh, both of Bartlesville, Okla.

[73] Assignee: Phillips Petroleum Company, Bartlesville, Okla.

[21] Appl. No.: 697,004

[22] Filed: Jun. 17, 1976

[51] Int. Cl.$^2$ .......................... C08F 4/14; C08F 4/16; C08F 36/06

[52] U.S. Cl. ............................. 526/117; 252/429 R; 526/120; 526/131; 526/154; 526/160; 526/308; 526/907

[58] Field of Search ............... 526/117, 120, 131, 154, 526/160, 308

[56] References Cited

U.S. PATENT DOCUMENTS

| | | | |
|---|---|---|---|
| 3,203,945 | 8/1965 | Zelinski | 526/907 |
| 3,400,115 | 9/1968 | Dawans et al. | 526/117 |
| 3,661,882 | 5/1972 | Hawkins et al. | 526/117 |
| 3,681,315 | 8/1972 | Yagi et al. | 526/907 |

FOREIGN PATENT DOCUMENTS 1070207  6/1967  United Kingdom .

OTHER PUBLICATIONS

Kuong et al., Chemical Abstracts, vol. 76, (1972), 72843u.

Chernenko et al., Chemical Abstracts, vol. 77, (1972), 35008a.

*Primary Examiner*—Edward J. Smith

[57] ABSTRACT

At least one conjugated diene is polymerized in the presence of a catalyzing amount of a catalyst consisting essentially of at least one Lewis acid and at least one cyclopolyolefin nickel complex.

7 Claims, No Drawings

CONJUGATED DIENE POLYMERIZATION PROCESS AND CATALYST

This invention relates to the polymerization of conjugated dienes. The word "polymerization" is used throughout this specification to include copolymerization reactions.

The term "conjugated diene" as used in this specification is meant to include acyclic conjugated dienes and conjugated cyclodienes. The term "conjugated cyclodiene" is intended to denote those cycloaliphatic compounds having two conjugated polymerizable ethylenic bonds within the cyclic ring. The term "acyclic conjugated diene" is intended to denote any aliphatic compounds having two conjugated polymerizable ethylenic bonds that are not within a cyclic ring.

Many processes for the polymerization of various conjugated dienes are known and from them a wide variety of polymeric products have been obtained which those skilled in the art have applied to various uses based upon the characteristics of the various polymers.

An object of the present invention is to provide a new process for the polymerization of conjugated dienes.

A further object is to provide a new process for the copolymerization of acyclic conjugated dienes with conjugated cyclodienes.

Another object is to provide a new catalyst composition for the polymerization of conjugated dienes.

Yet a further object of the present invention is to provide new copolymers of a conjugated cyclodiene and an acyclic conjugated diene.

SUMMARY OF THE INVENTION

According to this invention, at least one conjugated diene is polymerized employing a catalyzing amount of a catalyst mixture consisting essentially of at least one Lewis acid and at least one cyclopolyolefin nickel complex.

DETAILED DESCRIPTION OF THE INVENTION

Any suitable Lewis acid or mixture of Lewis acids can be employed in the catalyst mixture. Typical Lewis acids include titanium tetrachloride, titanium tetrabromide, titanium tetraiodide, boron trifluoride, boron trifluoride etherate, aluminum chloride, stannic chloride, aluminum bromide, aluminum sesquichloride, molybdenum pentachloride, and the like, and mixtures of any two or more thereof. The preferred Lewis acids are those generally employed as Friedel-Crafts type catalysts. The term Lewis acid is intended to denote those compounds considered as acids because of their affinity for accepting an electron pair as distinguished from Bronsted acids which are compounds considered as acids because of their tendency to lose a proton.

Also any suitable cyclopolyolefin nickel complex or mixture of cyclopolyolefin nickel complexes can be employed in the catalyst mixture. The suitable cyclopolyolefin nickel complexes fall into the general formula

Ni(L)$_n$ wherein n is an integer from 1 to 4 and each ligand L is individually selected from the group consisting of cyclopolyolefins having a cyclic ring consisting of 5 to 14 carbon atoms, a total of 5 to 18 carbon atoms per molecule, and at least two ethylenic bonds within the cyclic ring. Typical cyclopolyolefin nickel complexes include:
bis(1,5-cyclooctadiene)nickel (0)
bis(cyclopentadiene)nickel (0)
cyclooctatetraene nickel (0)
bis(duroquinone)nickel (0)
1,5,9-centro(all trans cyclododecatriene)nickel (0)
cyclohexadiene nickel (0)
bis(3,7-dimethyl-1,5-cyclooctadiene)nickel (0)
bis(3-phenyl-1,5-cyclooctadient)nickel (0)
1,5-cyclooctadiene-duroquinone nickel (0)
and mixtures of any two or more thereof.

The preferred cyclopolyolefin nickel complexes are zero-valent nickel complexes. Especially preferred zero-valent nickel complexes are those in which every ligand is a nonconjugated cyclopolyolefin ligand having 8 to 12 carbon atoms in the cyclic ring. Nonconjugated cyclopolyolefin denotes a carbocyclic ring containing at least two ethylenic groups wherein no ethylenic groups in the ring are conjugated. Examples of typical zero-valent nickel complexes include bis(1,5-cyclooctadiene)nickel (0); 1,5,9-centro(all trans cyclododecatriene)nickel (0); cyclooctatetraene nickel (0); bis(duroquinone)nickel (0); and mixtures of any two or more thereof.

The mole ratio of the catalyst components can vary widely. Any mixture of the catalyst components having catalytic activity can be employed. Generally the mole ratio of the above-described cyclopolyolefin nickel complex to the Lewis acid will be in the range of about 30:1 to about 1:30 or more preferably in the range of about 5:1 to about 1:20.

While it is to be understood that the catalyst composition can be employed in any amount that provides a catalyzing effect on the polymerization, generally the quantity of the above-described cyclopolyolefin nickel complex, expressed as gram millimoles per hundred grams of polymerizable conjugated diene, will be in the range of about 0.05 to about 50, and more preferably will be in the range of about 0.5 to about 10.

The present invention can be employed to polymerize any suitable conjugated diene or mixture of conjugated dienes. Generally acyclic conjugated dienes that are suitable for polymerization are those containing 4 to 12 carbon atoms per molecule. Acyclic conjugated dienes containing from 4 to 8 carbon atoms are the preferred acyclic conjugated dienes since they are more readily available and are generally more reactive than the higher molecular weight acyclic conjugated dienes. Examples of suitable acyclic conjugated dienes include 1,3-butadiene; isoprene; piperylene; 2-methyl-1,3-pentadiene; 2,3-dimethyl-1,3-butadiene; 1,3-octadiene; 5,6-diethyl-1,3-octadiene; and monohalogenated 1,3-butadiene and mixtures of any two or more thereof. Generally conjugated cyclodienes that are suitable for polymerization are those containing from 5 to 8 carbon atoms in the cyclic ring. The preferred conjugated cyclodienes are hydrocarbyl conjugated cyclodienes having 5 to 20 carbon atoms per molecule. Examples of some suitable conjugated cyclodienes include 1,3-cyclopentadiene; 2-methyl-1,3-cyclopentadiene; 5-ethyl-1,3-cyclopentadiene; 1,3-cyclohexadiene; 2-methyl-1,3-cyclohexadiene; 1-ethyl-1,3-cyclohexadiene; 1,4-dimethyl-5-isopropyl-1,3-cyclohexadiene; 2,3-dimethyl-5,6-diphenyl-1,3-cyclohexadiene; 2,3-diethyl-5-(n-butyl)-6-phenyl-1,3-cyclohexadiene; 1,3-cycloheptadiene; 1,3-cyclooctadiene; 6-chloro-1,3-cyclohexadiene; and the like and mixtures of any two or more thereof.

It is within the scope of the present invention to form homopolymers of selected acyclic conjugated dienes or conjugated cyclodienes, copolymers of two or more acyclic conjugated dienes, copolymers of two or more conjugated cyclodienes, or copolymers of at least one acyclic conjugated diene and at least one conjugated cyclodiene. In this specification the term copolymer is intended to include polymers prepared from two comonomers as well as those produced from more than two comonomers. In a preferred embodiment, copolymers of one acyclic conjugated diene and one conjugated cyclodiene are prepared.

In using the present invention to prepare copolymers a wide range of comonomer ratios can be employed. The comonomer ratios selected are a matter of choice depending only upon the characteristics desired in the final copolymer. In preparing copolymers of acyclic conjugated dienes and conjugated cyclodienes the weight ratio of acyclic conjugated dienes to conjugated cyclodiene comonomers is generally within the range of from about 99:1 to about 1:99; and preferably in the range of about 95:5 to about 30:70.

The process of the present invention is preferably carried out in the presence of a diluent. Diluents suitable for use in the process include hydrocarbons which are not detrimental to the copolymerization process. Suitable diluents include paraffins, cycloparaffins, and aromatic hydrocarbons and mixtures thereof. Typical diluents are n-hexane; n-heptane; 2,2,4-trimethylpentane; cyclohexane; benzene; toluene; xylenes; and the like, and mixtures of any two or more thereof. In order to promote conversion it has been noted that it is preferable to employ aromatic hydrocarbon diluents.

If the monomer to be polymerized is normally a liquid, under the conditions of the reaction, the process can be carried out without added diluent. Normally, however, it is preferred to use a diluent, as described above, in an amount such that the volume percent of the conjugated diene to be polymerized in the diluent is about 5 to about 50 percent of the combined volume of said conjugated diene and said diluent.

The pressure in the reaction vessel in which the polymerization is carried out is not critical and may be varied as desired. It is convenient to employ a pressure which is sufficient to maintain the reaction mixture substantially in the liquid phase. Depending, therefore, upon the materials and temperature employed an autogenous or an elevated pressure can be employed. When elevated pressures are desired they can be provided by a method such as the pressurization of the reactor with a gas which is inert with respect to the polymerization reaction.

The polymerization temperature for the present invention can be any temperature at which the catalyst will promote the polymerization of conjugated diene. Generally the temperature will be in the range of about $-40°$ C. to about $120°$ C.; and preferably the polymerization is conducted at a temperature in the range of about $20°$ C. to about $70°$ C.

The time required for the polymerization, exclusive of the time required in catalyst formation and reactor charging, will be dependent upon such factors as the polymer molecular weight desired, quantity of catalyst employed, temperature, and the like, but generally will be in the range of about five minutes to about 100 hours; preferably the polymerization time falls within the range of about 30 minutes to about 24 hours.

The polymerization according to the present invention can be brought about by mixing the various ingredients in any order. In preparing copolymers of acyclic conjugated dienes and conjugated cyclodienes when certain Lewis acid cocatalysts are employed it has been determined that higher conversions can be obtained if the diluent and the comonomers are charged to the reaction zone prior to the addition of the catalyst components. Also it has been found that if at least one catalyst component is charged before the comonomers, higher conversions are obtained if the acyclic conjugated diene is charged prior to the conjugated cyclodiene.

Any conventional technique can be employed for conducting the polymerization reaction, such as a continuous polymerization, a semicontinuous polymerization in serially connected polymerization reactors, or a batch reaction in a single reactor. Inasmuch as certain impurities can deleteriously affect the activity of the catalyst of the present invention, it is important to take the necessary precautions conventionally used to eliminate such impurities from the reactants. Such impurities include, for example, carbon monoxide, water, and oxygen. In order to minimize the presence of such deleterious impurities the conventional purging methods should be employed.

When the polymerization is terminated, any one of many conventional polymerization work-up procedures can be employed to inactivate the catalyst and recover the final product. For example, according to one process the diluent can be removed by steam stripping to leave the polymer. In another suitable method a catalyst-inactivating material, such as alcohol, can be added to the mixture so as to inactivate the catalyst and cause precipitation of the polymer whereupon the polymer can then be separated from the alcohol and diluent by any suitable means, such as decantation or filtration.

As a polymer additive, it has been found advantageous to add an antioxidant, such as 2,6-di-t-butyl-4-methylphenol to the polymer solution prior to the recovery of the polymer, as is often done in conventional polymerization processes.

The type of homopolymers and copolymers produced according to this invention can vary from lower molecular weight liquids to high molecular weight normally solid polymers depending upon, for instance, the reaction conditions employed, quantities of catalyst employed, and the catalyst components employed. From the inherent characteristics of the polymers produced, those skilled in the art will recognize various applications for which the various polymers can be used. For example, low molecular weight polymer can be produced according to this invention that can be used in adhesive formulations, as additives for drying oils, as coatings, and as plasticizers for rubber compositions. The high molecular weight normally solid polymers have applications comparable to previously known conjugated diene polymers having similar characteristics. For example, high molecular weight polymers can be produced according to this invention that are suitable for use in adhesive formulations and in molded or extruded articles. The polymers of this invention can be treated and compounded according to the methods known for treating and compounding natural and previously known synthetic rubbers. Further, the polymers produced according to this invention can be readily epoxidized, halogenated, hydrogenated, hydrohalogenated, and otherwise reacted to yield new and useful products.

When the process of this invention is utilized to produce copolymers of acyclic conjugated dienes and conjugated cyclodienes, such copolymers are essentially random. The weight ratio of acyclic conjugated diene derived units to conjugated cyclodiene derived units in the resultant copolymers can vary widely, generally being in the range of about 99:1 to about 1:99. Particularly interesting are the random copolymers of 1,3-butadiene and 1,3-cyclohexadiene having a weight ratio of 1,3-butadiene derived units to 1,3-cyclohexadiene derived units in the range of about 60:40 to about 10:90.

Generally the polymers produced according to this invention have a cis-1,4-microstructure in the range of from about 99 to about 5 weight percent. The amount of cis, trans, and vinyl microstructure in the polymers produced according to this invention will vary depending upon the catalyst components selected. For example, a catalyst composition consisting essentially of bis(cyclooctadiene)nickel (0) and titanium tetrachloride resulted in a 1,3-butadiene/1,3-cyclohexadiene copolymer having about 96 weight percent cis-1,4-microstructure. A catalyst composition consisting essentially of bis(cyclooctadiene)nickel (0) and molybdenum pentachloride, on the other hand, produced a 1,3-butadiene/1,3-cyclohexadiene copolymer having about 90 weight percent 1,2- (or vinyl-) microstructure. Random copolymers of 1,3-butadiene and 1,3-cyclohexadiene having a vinyl content in the range of from about 10 to about 90 weight percent are considered to be heretofore unknown to those skilled in the art.

The foregoing description should enable one skilled in the art to utilize the present invention to its fullest extent. The following examples of preferred specific embodiments of the present invention are to be construed as merely illustrative and not limitative of the remainder of the specification and claims.

EXAMPLES

Polymerizations were carried out under nitrogen in capped beverage bottles employing anhydrous reactants and conditions. The charge order is the order of the listing of the recipe components in each of the recipes, except as otherwise indicated. The bottles were tumbled in a constant temperature bath for the indicated polymerization times and at the indicated temperatures. Following polymerization, 2,6-di-t-butyl-4-methylphenol in a toluene/isopropyl alcohol solution was added to the polymerization mixture (the solution consisted of equal volumes of toluene and isopropyl alcohol and about 10.8 weight percent of the phenol antioxidant, based on the weight of the total solution), the amount of solution added was such that about 1 part by weight of the andioxidant was added for every 100 parts by weight of monomer, and the polymers were coagulated by adding the solution to isopropyl alcohol. The polymers were then collected by filtration and dried at reduced pressure.

The following examples employ the following abbreviations:

phm=parts by weight per hundred parts by weight monomer.

mhm=gram millimoles per hundred grams total monomer.

IV=inherent viscosity.

Also, in the following examples the inherent viscosity (IV) and gel content were determined in accordance with notes (a) and (b), respectively, in U.S. Pat. No. 3,278,508, column 20, with the modification that tetrahydrofuran was used in place of toluene and with the further modification that the solution was not filtered through a sulfur absorption tube but rather a sample of the solution was filtered through a fritted glass filter stick of grade C porosity and pressured directly into the viscosimeter. The weight average molecular weight and the number average molecular weight, where determined, were determined by gel permeation chromatograph in accordance with G. Kraus and C. J. Stacy, *J. Poly. Sci.*, A-2 10, 657 (1972). The heterogeneity index (HI) is the value obtained by dividing the weight average molecular weight by the number average molecular weight. The microstructure of the polymers was determined by infrared absorption spectroscopy. Vibron temperature scans, that is, temperature scans of the dynamic viscoelastic properties of the polymers, were obtained employing a Vibron Direct Reading Viscoleastometer, Goyo Measuring Instruments Co., Ltd., Tokyo, Japan. The Vibron temperature scan was employed to determine polymer glass transition temperature. In the following tables the presence of a dash (-) indicates that no determination was made.

EXAMPLE 1

A 1,3-butadiene/cyclohexadiene copolymer was synthesized in accordance with the following recipe:

| Recipe | phm | mhm |
|---|---|---|
| Toluene (PhMe) | 220 | |
| 1,3-Butadiene (Bd) | 40 | |
| 1,3-Cyclohexadiene (CH) | 60 | |
| Bis(1,5-cyclooctadiene)nickel ([COD]$_2$Ni) | | 4.5 |
| Titanium tetrachloride (TiCl$_4$) | | 7.5 |
| Polymerization temperture, °C. | 30 | |
| Polymerization time, hrs. | 24 | |

Evaluation of the copolymerization and copolymer revealed the characteristics shown in Table I. The copolymer was a solid, nonsticky polymer.

TABLE I

| | |
|---|---|
| Conversion, wt. % | 60 |
| Tensile, psig[a] | 105 at 1000% elongation[b] |
| Inherent viscosity | 0.59 |
| Gel, wt. % | 0 |
| Weight average molecular weight, $\times 10^{-3}$ | 176 |
| Number average molecular weight, $\times 10^{-3}$ | 27 |
| Heterogeneity index | 6.7 |
| Trans, wt. % | 0.6 |
| Vinyl, wt. % | 3.1 |
| Glass transition temperature, °C. | 0 |

[a]ASTM D 412-66
[b]Sample did not break. The limit of the test equipment was reached without breaking the samples.

The Vibron temperature scan indicated that the major part of the copolymer was a random copolymer. In view of the temperature scan it was considered unlikely that the copolymer could contain any substantial amount of block cyclohexadiene.

EXAMPLES 2-9

Employing catalyst compositions of this invention a series of polymerizations were carried out in accordance with the following recipe:

| Recipe | phm | mhm |
|---|---|---|
| PhMe | 860 | |
| Bd | variable | |
| CH | variable | |
| $(COD)_2Ni$ | | 4.5 |
| Cocatalyst | | variable |
| Polymerization temperature, °C. | | 30 |
| Polymerization time, hrs. | | 20 |

The results of these polymerizations are shown in Table II.

TABLE II

| Example No. | Bd phm | CH phm | $TiCl_4$ mhm | $SnCl_4$ mhm | $BF_3O(C_2H_5)_2$ mhm | Conversion wt. % |
|---|---|---|---|---|---|---|
| 2 | 100 | 0 | 7.5 | 0 | 0 | 80 |
| 3 | 0 | 100 | 7.5 | 0 | 0 | 16 |
| 4 | 100 | 0 | 0 | 7.5 | 0 | 21 |
| 5 | 50 | 50 | 0 | 7.5 | 0 | 14 |
| 6 | 0 | 100 | 0 | 7.5 | 0 | 8 |
| 7 | 100 | 0 | 0 | 0 | 7.5 | 61 |
| 8 | 50 | 50 | 0 | 0 | 7.5 | 30 |
| 9 | 0 | 100 | 0 | 0 | 7.5 | 11 |

The data in Table II show that the catalyst compositions are effective in both copolymerization and homopolymerization. The data also establish that for the copolymerization reaction, stannic chloride ($SnCl_4$) or boron trifluoride etherate [$BF_3$—$O(C_2H_5)_2$] can be used as the Lewis acid in the catalyst composition in place of titanium tetrachloride.

EXAMPLES 10-21

Employing catalyst compositions of this invention a series of polymerizations were made employing the following recipe:

| Recipe | phm | mhm |
|---|---|---|
| PhMe | 430 | |
| Bd | variable | |
| CH | variable | |
| $(COD)_2Ni$ | | 4.5 |
| Cocatalyst | | 7.5 |
| Polymerization temperature, °C. | | variable |
| Polymerization time, hrs. | | 20 |

The results of these polymerizations are shown in Table III.

TABLE III

| Ex. No. | Bd phm | CH phm | Cocatalyst | °C. | Conversion wt. %[c] | I.V. | Gel wt. % |
|---|---|---|---|---|---|---|---|
| 10 | 100 | 0 | $TiCl_4$ | 30 | 84 | 0.37 | 0 |
| 11 | 50 | 50 | " | " | 50 | 0.52 | 0 |
| 12 | 0 | 100 | " | " | 13 | — | — |
| 13 | 70 | 30 | " | " | 61 | 0.54 | 1 |
| 14 | 80 | 20 | " | " | 66 | 0.60 | 0 |
| 15[a] | 70 | 30 | " | " | 18 | — | — |
| 16[b] | 70 | 30 | " | " | 52 | 0.56 | 9 |
| 17 | 100 | 0 | " | 50 | 88 | 0.60 | 3 |
| 18 | 70 | 30 | " | " | 84 | 0.38 | 1 |
| 19[a] | 70 | 30 | $BF_3$—$O(C_2H_5)_2$ | " | 41 | — | — |
| 20[b] | 70 | 30 | " | " | 44 | — | — |
| 21 | 70 | 30 | " | " | 40 | 0.28 | 0 |

[a]The monomers were added to the solvent/catalyst combination after the latter had been allowed to stand thus premixed for 30 min.
[b]The polymerization mixtures were not tumbled during polymerization.
[c]An additional approximately 5 to 8 percent conversion per run was represented by low molecular weight material obtained by evaporating mother liquor following coagulation.

By comparing Example 18 with Example 13 one can see that higher polymerization temperatures favor higher conversions. Examples 18 and 21 indicate that conversion is better when the Lewis acid in the catalyst composition is $TiCl_4$ rather than $BF_3$—$O(C_2H_5)_2$. Examples 11, 13 and 14 indicate that greater Bd/CH ratios favor higher conversion.

EXAMPLES 22-28

Employing a catalyst of this invention a series of copolymerizations were conducted employing different solvents (diluents), polymerization times, and monomer ratios. The polymerization involved the following recipe:

| Recipe | phm | mhm |
|---|---|---|
| Solvent | 430 | |
| Bd | variable | |
| CH | variable | |
| $(COD)_2Ni$ | | 4.5 |
| $TiCl_4$ | | 7.5 |
| Polymerization temperature, °C. | | 30 |
| Polymerization time, hrs. | | variable |

The results of these copolymerizations are shown in Table IV.

TABLE IV

| Ex. No. | Solvent | Bd phm | CH phm | Hrs | Conversion wt. % | I.V. | Gel wt. % | Polymer[a] Bd | Polymer[a] CH |
|---|---|---|---|---|---|---|---|---|---|
| 22 | PhMe | 40 | 60 | 90 | 72 | 0.46 | 0 | 33 | 67 |
| 23 | " | 40 | 60 | 20 | 44 | 0.50 | 10 | 10 | 90 |
| 24 | " | 50 | 50 | 20 | 47 | 0.54 | 10 | 22 | 78 |
| 25 | " | 70 | 30 | 20 | 58 | 0.58 | 0 | 62 | 38 |
| 26 | " | 80 | 20 | 20 | 61 | 0.39 | 1 | 56 | 44 |
| 27 | Benzene | 40 | 60 | 20 | 48 | 0.51 | 3 | — | — |
| 28 | n-Hexane | 70 | 30 | 20 | 36 | 0.36 | 67 | — | — |

[a]Polymer composition in terms of weight percentage monomer composition determined by nuclear magnetic resonance spectroscopy.

Inspection of Table IV indicates that the paraffinic solvent of run 28 is less preferred over the aromatic solvent of run 25 in terms of conversion, molecular weight as reflected in inherent viscosity and because of favoring gel formation. Not surprisingly, the degree of conversion at 90 hours exceeds that at 20 hours (run 22 vs. run 23). The NMR data shows the polymers to be richer in cyclohexadiene than were the corresponding comonomer mixtures.

EXAMPLES 29-31

A series of copolymers were prepared in accordance with this invention employing varying amounts of butadiene and 1,3-cyclohexadiene. The following recipe was employed.

| Recipe | phm | mhm |
|---|---|---|
| PhMe | 430 | |
| Bd | variable | |
| CH | variable | |
| $(COD)_2Ni$ | | 4.5 |
| $TiCl_4$ | | 7.5 |
| Polymerization temperature, °C. | 30 | |
| Polymerization time, hrs. | 24 | |

The results of the copolymerization runs are summarized in Table V which also demonstrates the effect of butadiene content in the copolymer on the Wallace Plastimeter values, which provide an indication of resistance to flow in polymers or copolymers.

TABLE V

| Run No. | Bd phm | CH phm | Conversion wt. % | I.V. | Gel wt. % | Wallace Plastimeter[a] |
|---|---|---|---|---|---|---|
| 29 | 40 | 60 | 55.5 | 0.65 | 0 | 13.0 |
| 30 | 50 | 50 | 60.5 | 0.71 | 0 | 7.0 |
| 31 | 70 | 30 | 70.5 | 0.78 | 0 | —[b] |

[a]Operating Instructions, Wallace Rapid Plastimeter, June 1965, H. W. Wallace and Co., Ltd., St. James Rd., Croydon, Surrey, England.
[b]Polymer too soft for determination.

From Table V it will again be noted that conversion appears to be greater when the Bd/CH charge ratio is greater. The Wallace Plastimeter values clearly fall with increased butadiene content in the monomer charge. In other words the polymer becomes less tough as the Bd/CH charge ratio is increased.

EXAMPLES 32-43

Employing the following recipe a series of copolymerizations were conducted which show the effects of variations in charge order in this invention.

| Recipe | phm | mhm |
|---|---|---|
| PhMe | 260 | |
| Bd | 70 | |
| CH | 30 | |
| $(COD)_2Ni$ | | 4.5 |
| $TiCl_4$ (when employed) | | 7.5 |
| $BF_3—O(C_2H_5)_3$ (when employed) | | 6.0 |
| Polymerization temperature, °C. | 30 | |
| Polymerization time, hrs. | 20 | |

The results of the polymerizations are summarized in Table VI.

TABLE VI

| Run No. | Charge Order[1] | | | | | Conversion wt. % | Polymer Description | I.V. | Gel wt. % |
|---|---|---|---|---|---|---|---|---|---|
| 32 | PhMe | Bd | CH | Ni | Ti | 67 | sticky solid | 0.81 | 0 |
| 33 | " | Ni | Ti | Bd | CH | 39 | sticky solid | 0.45 | 8 |
| 34 | " | Ni | Ti | CH | Bd | 17 | sticky solid | — | — |
| 35 | " | Ni | CH | Bd | Ti | 2 | — | — | — |
| 36 | " | Ni | CH | Z | Bd | Ti | trace | — | — |
| 37 | " | Ni | Bd | Z | CH | Ti | 50 | liquid | 0.35 | 0 |
| 38 | " | Bd | CH | Ni | $BF_3$ | 33 | liquid | — | — |
| 39 | " | Ni | $BF_3$ | Bd | CH | 41 | liquid | — | — |
| 40 | " | Ni | $BF_3$ | CH | Bd | trace | — | — | — |
| 41 | " | Ni | CH | Bd | $BF_3$ | trace | — | — | — |
| 42 | " | Ni | CH | Z | Bd | $BF_3$ | trace | — | — |
| 43 | " | Ni | Bd | Z | CH | $BF_3$ | 30 | liquid | — | — |

[1]Charge order of components, reading left to right, with Ni = $(COD)_2Ni$, Ti = $TiCl_4$, $BF_3$ = $BF_3—O(C_2H_5)_2$, Z = tumbling for 30 minutes at 50° C.

The above data indicate that the most desirable charge order in terms of conversion when the catalyst consists essentially of $(COD)_2Ni$ and $TiCl_4$ is the charging of the comonomers prior to the charging of the catalyst. When the catalyst consists essentially of $(COD)_2Ni$ and $BF_3—O(C_2H_5)_2$, on the other hand, higher conversion is obtained when the catalyst composition is charged prior to the charging to the comonomers. The above data also indicate that regardless of when the catalyst composition is charged, higher conversions are obtained when the butadiene is charged before the cyclohexadiene.

EXAMPLE 44

A copolymerization according to the present invention was made employing the following recipe.

| Recipe | phm | mhm |
|---|---|---|
| PhMe | 860 | |
| Bd | 70 | |
| CH | 30 | |
| $(COD)_2Ni$ | | 4.5 |
| $MoCl_5$ | | 1.5[a] |
| Polymerization temperature, °C. | 30 | |
| Polymerization time, hrs. | 20 | |

[a]The $MoCl_5$ was added as a suspension in PhMe. The amount is an estimate based on the amount of suspension used. The suspension contained about 0.2 gm of $MoCl_5$ per 100 ml of PhMe.

The copolymerization resulted in a rubbery solid. The results of the polymerization are summarized in Table VII.

TABLE VII

| Conversion, wt. % | 17 |
|---|---|
| I.V. | 4.36 |
| Gel, wt. % | 0 |
| Trans, wt. % | 2.7 |

TABLE VII-continued

| | |
|---|---|
| Vinyl, wt. % | 89.4 |

Especially notable is the fact that with the $MoCl_5$ as the Lewis acid cocatalyst of the catalyst composition the resulting copolymer had very high vinyl microstructure. Compare this polymer with the one prepared in Example 1 with $TiCl_4$ rather than $MoCl_5$ where the polymer was high in cis microstructure rather than vivyl microstructure.

EXAMPLE 45

A homopolymerization according to the present invention was made employing the following recipe:

| Recipe | phm | mhm |
|---|---|---|
| PhMe | 835 | |
| Bd | 100 | |
| $(COD)_2Ni$ | | 4.5 |
| $MoCl_5$ | | 1.5$^{(2)}$ |
| Polymerization temperature, °C. | | 30 |
| Polymerization time, hrs. | | 20 |

$^{(a)}$The $MoCl_5$ was added as a suspension in PhMe. The amount is an estimate based on the amount of suspension used. The suspension contained about 0.2 gm of $MoCl_5$ per 100 ml of PhMe.

The homopolymerization resulted in a high molecular weight solid polymer. The results of the polymerization are summarized in Table VIII.

TABLE VIII

| | |
|---|---|
| Conversion, wt. % | 20 |
| I.V. | 5.09 |
| Gel, wt. % | 0 |
| Trans, wt. % | 2.4 |
| Vinyl, wt. % | 90.6 |

This example provides further support that the $MoCl_5$ cocatalyst favors the formatin of 1,2-vinyl substitution during the polymerization From the foregoing description and demonstrative examples, one skilled in the art can easily ascertain the essential characteristics of this invention, and without departing from the spirit and scope thereof, can make various changes and modifications of the invention to adapt it to various usages and conditions. Consequently, such changes and modifications should be viewed as being within the scope of equivalence of the following claims.

What is claimed is:

1. In the copolymerization of 1,3-butadiene and 1,3-cyclohexadiene, wherein the weight ratio of 1,3-butadiene to 1,3-cyclohexadiene comonomer is in the range of about 99:1 to about 1:99, under polymerization conditions wherein the temperature of polymerization is in the range of about −40° C. to about 120° C., with a catalytic amount of catalyst mixture consisting essentially of bis(1,5-cyclooctadiene)-nickel and at least one Lewis acid selected from the group consisting of titanium tetrachloride and boron trifluoride etherate, wherein the amount of bis(1,5-cyclooctadiene)-nickel is in the range of about 0.5 to about 10 gram millimoles for every 100 grams of total comonomers and the molar ratio of the bis(1,5-cyclooctadiene)-nickel to Lewis acid is in the range of about 5:1 to about 1:20, the improvement comprising charging the 1,3-butadiene to the reaction zone prior to the charging of the 1,3-cyclo-hexadiene and charging the bis(1,5-cyclooctadiene)-nickel to the reaction zone prior to the charging of the 1,3-butadiene.

2. A copolymerization according to claim 1 wherein the Lewis acid is titanium tetrachloride.

3. A process according to claim 2 wherein said titanium tetrachloride is charged to the reaction zone after the 1,3-cyclohexadiene.

4. A process according to claim 1 wherein the Lewis acid is boron trifluoride etherate.

5. A process according to claim 4 wherein the bis(1,5-cyclooctadiene)nickel and the boron trifluoride etherate are charged to the reaction zone prior to the 1,3-butadiene.

6. A process according to claim 4 wherein the bis(1,5-cyclooctadiene)nickel is charged to the reaction zone prior to the 1,3-butadiene and the 1,3-butadiene is charged to the reaction zone prior to the boron trifluoride etherate.

7. In the copolymerization of 1,3 -butadiene and 1,3-cyclohexadiene, wherein the weight ratio of 1,3 butadiene to 1,3 cyclohexadiene comonomers is in the range of about 99:1 to about 1:99, under polymerization conditions wherein the temperature of the polymerization is in the range of about −40° C. to about 120° C., with a catalytic amount of a catalyst mixture consisting essentially of bis(1,5-cyclooctadiene)-nickel and titanium tetrachloride wherein the amount of bis(1,5-cyclooctadiene)nickel is in the range of about 0.5 to about 10 gram millimoles for every 100 grams of total monomers, and the molar ratio of the bis(1,5-cyclooctadiene)nickel to titanium tetrachloride is in the range of about 5:1 to about 1:20, the improvement comprising charging said 1,3-butadiene and said 1,3-cyclohexadiene to the reaction zone prior to the charging of the titanium tetrachloride or the bis(1,5-cyclooctadiene).

* * * * *